United States Patent [19]

Kambara

[11] 4,207,399

[45] Jun. 10, 1980

[54] METHYLQUINOLINE HIGH POLYMER BASED ON QUATERNARY AMMONIUM POLYMERS

[75] Inventor: Hiroshi Kambara, Abiko, Japan

[73] Assignee: Rohm & Haas Company, Philadelphia, Pa.

[21] Appl. No.: 20,285

[22] Filed: Mar. 14, 1979

[51] Int. Cl.$^2$ .......................... C08L 39/04; C08F 8/32
[52] U.S. Cl. ...................................... 521/32; 525/375; 525/333
[58] Field of Search ........................... 521/32; 525/375

[56] References Cited

U.S. PATENT DOCUMENTS

| | | | |
|---|---|---|---|
| 2,824,844 | 2/1958 | Gilwood | 521/32 |
| 2,840,533 | 6/1958 | Hiva | 521/32 |

OTHER PUBLICATIONS

Journal of the Amer. Chem. Society, vol. 94, pp. 2545–2547.
Organic Synthesis, vol. 56, pp. 95–101.
Styrene and Related Polymer, pp. 166–172.

*Primary Examiner*—Joseph L. Schofer
*Assistant Examiner*—Peter F. Kulkosky

[57] ABSTRACT

High polymers containing methylquinoline groups are prepared by reacting a crosslinked high polymer having quaternary ammonium groups with a methylquinoline compound such as methylquinoline until all or a portion of said quaternary ammonium groups are reacted with said methylquinoline compound. The high polymers are useful as anion exchange resins having intermediate basicity.

11 Claims, No Drawings

METHYLQUINOLINE HIGH POLYMER BASED ON QUATERNARY AMMONIUM POLYMERS

DETAILED DESCRIPTION

This invention relates to novel high polymers useful for industrial applications such as ion exchange, and to a method of preparation. More particularly, this invention relates to high polymers possessing a quinoline group, prepared by reacting a methylquinoline compound with a crosslinked high polymer possessing quaternary ammonium groups in the presence of an alkaline reagent to thereby react, as by substitution, the quaternary ammonium groups with the methylquinoline compound.

Crosslinked high polymers useful in preparing the polymers of the invention are polymers possessing quaternary ammonium groups and having an insoluble, infusible structure. Many polymers of this type are commercially produced and extensively used as strongly basic anion-exchange resins. Generally, the substrate polymers which can be used for manufacture of the high polymers of the present invention include adsorbents and ion exchange resins, both gel and macroreticular. One class of such polymers comprises crosslinked haloalkyl group-containing copolymers of an aromatic monovinyl hydrocarbon and an aromatic divinyl hydrocarbon which is reacted with a tertiary amine to form quaternary ammonium groups, such as described in U.S. Pats. Nos. 2,591,573, 2,614,099 and 2,632,001. A second class comprises crosslinked polymers of an acrylic or methacrylic acid or ester and polyethylenically unsaturated compounds, which are aminated with amino compounds containing at least two amino groups followed by quaternization with an alkyl halide. Typical acrylic polymers of the gel type which may be quaternized in the latter fashion are described in U.S. Pat. No. 2,675,359. Typical quaternized acrylic and aromatic polymers of the macroreticular type are described in U.S. Pat. No. 3,791,866. Typical gel and macroreticular polymers which may be quaternized by either route are described in U.S. Pat. No. 3,728,318. The substrate polymers may be crosslinked to any degree desired, for example 0.5 to 80%, as described in the aforementioned patents, provided the polymers may be sufficiently functionalized for use as an adsorbent or ion exchange resin. However, for ion exchange resin use, since total exchange capacity usually decreases with increased crosslinking, about 0.5–30% crosslinking, preferably about 0.5–15%, on a crosslinking monomer weight basis, is recommended.

Examples of methylquinolines which are usable for the present invention include substituted and unsubstituted methylquinoline compounds such as compounds of the formula

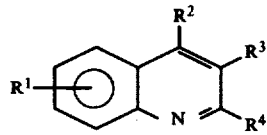

wherein $R^1$ is hydrogen or methyl and $R_2$, $R^3$ and $R^4$ independently are hydrogen, lower akyl ($C_1$–$C_8$, preferably $C_1$–$C_4$), halogen, hydroxyl or any other group which will not interfere in the reaction with the quaternary ammonium group of the crosslinked polymer substrate, and where at least one of $R^1$, $R^2$, $R^3$ and $R^4$ is methyl. The preferred methylquinoline compounds are the various isomers of methylquinoline, e.g., 2-methylquinoline, 4-methylquinoline, 6-methylquinoline, 7-methylquinoline, and 8-methylquinoline.

While the exact structure of the polymers of the invention is unknown, it is believed that the quaternary ammonium groups of the crosslinked high polymer are partially or wholly substituted with the methyl quinoline compounds. Another possibility is the following product based on a 5, 6, 7 or 8 methylquinoline (although other methylquinoline isomers are also suitable), where R is an alkyl ($C_1$–$C_4$) group of the quaternary ammonium groups remaining in the polymer matrix, X is an anion such as halogen, and n and m are the number of repeating units of each type:

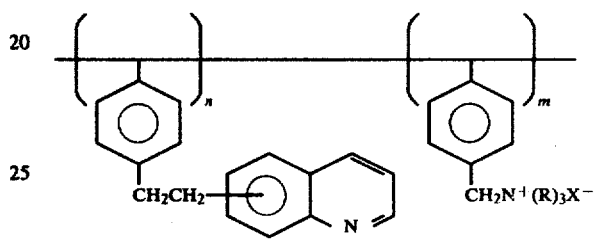

Although the polymers of the invention include those wherein all of the quaternary ammonium groups may be substituted (fully or partially) or replaced (fully or partially) by methylquinoline groups, it is preferred that the polymers retain a portion of the quaternary ammonium groups so that the basicity of the polymers will be intermediate the basicity of a purely quaternary ammonium polymer and those wherein all of the quaternary ammonium groups are substituted or replaced. The intermediate basicity is advantageous in some ion exchange applications because of better ion mobility.

The alkaline reagent used for the present invention may be of any the many types known to be effective for base-catalyzed reactions. Examples of alkaline reagents advantageously used include alkali metals such as metallic sodium and metallic alkalis, and alkali alcoholates such as sodium ethalate.

The reaction of the present invention is carried out in any solvent suitable for base catalyzed reactions. Examples of suitable solvents include alcohols such as methanol, ethanol and propanol; non-condensable ketones such as diphenyl ketone; ethers such as ether and dioxane; aromatic hydrocarbons such as benzene, toluene and xylene; esters such as methyl acetate and ethyl acetate; and water.

The reaction time and the reaction temperature for the reaction of the invention are not critical and may readily be selected to provide the best results in terms of reaction control and yield.

The high polymers of the present invention are useful as adsorbents and ion exchange resins in a wide variety of industrial applications, generally wherever adsorbents and ion exchange resins of intermediate basicity are effective, e.g., for purifications, separations, recovery of valuable ionic constituents, replacements of deleterious ions with innocuous ions, fractionations, deionization, and the like. The high polymers have specific utility in biochemical and pharmaceutical fields, for example, as acid scavengers and in the separation of compounds having amino and carboxyl functionality, such as amino acids.

The invention will be more particularly described with reference to the following examples.

EXAMPLE 1

A styrene-divinylbenzene gel anion-exchange resin having quaternary ammonium functionality ("Amberlite IRA-402", Rohm and Haas Company) was washed with ethanol and then dried. In a four-necked 3-liter flask fitted with a dropping funnel, a reflux condensor and an agitator, a mixture of 150 g. of the dried resin and 700 ml. of ethanol was stirred at 70°–80° C. for one hour. The resultant mixture was stirred with 372 g. of 2-methylquinoline at refluxing temperature for 20 hours, with 300 ml. of a solution of 4 N sodium ethalate in ethanol added dropwise thereto through the dropping funnel. The reaction product was separated by filtration and washed with water, methanol and acetone. The infrared adsorption spectrum of this reaction product indicated substantial incorporation of the 2-methylquinoline into the polymer.

Subsequently, the reaction product was thoroughly hydrated (water quench) and tested for ion exchange capacity as compared with capacity before reaction with the 2-methylquinoline. The results, shown in the following table, indicate both strong and weak base capacity.

Table 1

|  | Before reaction | After reaction |
| --- | --- | --- |
| Water content (%) | 54 | 38 |
| Strongly basic exchange capacity (meq./g., dry) | 4.2 | 1.9 |
| Weakly basic exchange capacity (meq./g., dry) | 0 | 0.8 |

EXAMPLE 2

The procedure of Example 1 was followed in all essential respects, except for use of a styrene-divinylbenzene macroreticular anion-exchange resin ("Amberlite IRA-900", Rohm and Haas Company). The infrared absorption spectrum of the reaction product indicated substantial incorporation of the 2-methylquinoline.

Subsequently, the reaction product was thoroughly hydrated and tested as in Example 1 for exchange capacity. The results in the following table show both strong and weak base capacity.

Table 2

|  | Before reaction | After reaction |
| --- | --- | --- |
| Water content (%) | 64 | 54 |
| Strongly basic exchange capacity (meq./g., dry) | 4.2 | 1.4 |
| Weakly basic exchange capacity (meq./g., dry) | 0 | 1.0 |

I claim:

1. A high polymer prepared by reacting in the presence of an alkaline catalyst a crosslinked polymer having quaternary ammonium groups with a methylquinoline compound until all or a portion of said quaternary ammonium groups are reacted with said methylquinoline compound.

2. A high polymer as in claim 1 wherein said methylquinoline compound is methylquinoline.

3. A high polymer as in claim 1 wherein said crosslinked polymer is a gel copolymer.

4. A high polymer as in claim 1 wherein said crosslinked polymer is a macroreticular copolymer.

5. A high polymer as in claim 1 wherein said methylquinoline compound is methylquinoline, and said crosslinked polymer is a gel copolymer, and a portion of said quaternary groups are reacted with said methylquinoline.

6. A high polymer as in claim 1 wherein said methylquinoline compound is methylquinoline, said crosslinked polymer is a macroreticular copolymer, and a portion of said quaternary ammonium groups are reacted with said methylquinoline.

7. A method of preparing a high polymer, which comprises reacting a crosslinked polymer having quaternary ammonium groups with a methylquinoline compound in the presence of an alkaline catalyst until all or a portion of said quaternary ammonium groups are reacted with said methylquinoline compound.

8. A method as in claim 7 wherein said methyquinoline compound is methylquinoline and said crosslinked polymer is a gel copolymer.

9. A method as in claim 7 wherein said methylquinoline compound is methylquinoline and said crosslinked polymer is a macroreticular copolymer.

10. A method as in claim 8 wherein a portion of the quaternary ammonium groups of said gel copolymer are reacted with said methylquinoline.

11. A method as in claim 9 wherein a portion of the quaternary ammonium groups of said macroreticular copolymer are reacted with said methylquinoline.

* * * * *